June 4, 1968
E. P. JASPER
Re. 26,400
COOLING SYSTEM FOR MARINE ENGINES
Original Filed May 28, 1962
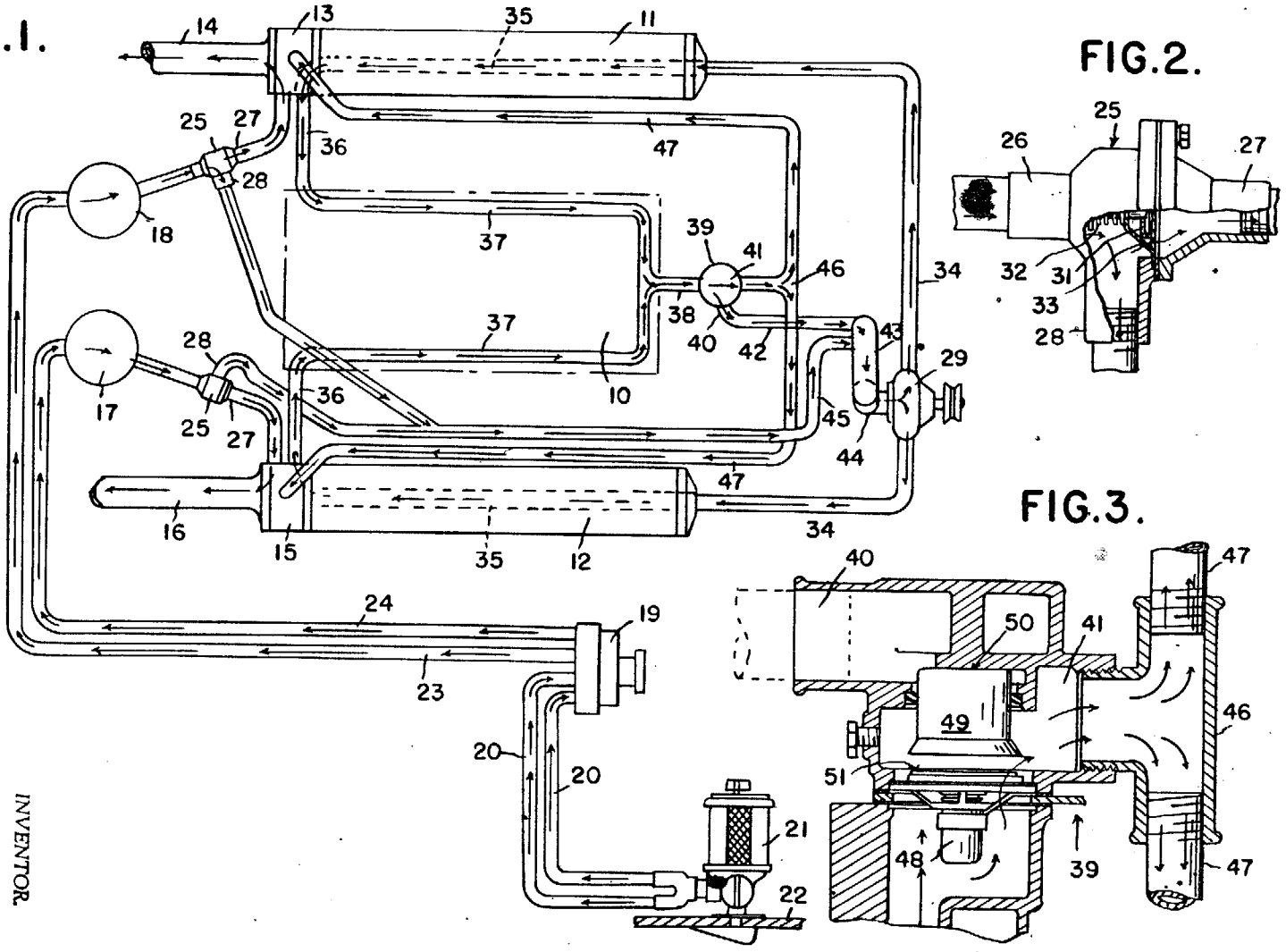
INVENTOR.
ELMER P. JASPER
BY
Whittemore Hulbert & Belknap
ATTORNEYS United States Patent Office Re. 26,400
Reissued June 4, 1968

26,400

COOLING SYSTEM FOR MARINE ENGINES

Elmer P. Jasper, Algonac, Mich., assignor, by mesne assignments, to Chris Craft Industries, Oakland, Calif., a corporation of Delaware Original No. 3,105,472, dated Oct. 1, 1963, Ser. No. 198,176, May 28, 1962. Application for reissue Sept. 7, 1965, Ser. No. 485,978

18 Claims. (Cl. 123—41.08)

Matter enclosed in heavy brackets [ ] appears in the original patent but forms no part of this reissue specification; matter printed in italics indicates the additions made by reissue.

The invention relates to cooling systems for marine engines.

Marine engines normally use sea water as the primary coolant. Since boats with marine engines often navigate in both salt water and fresh water, an engine cooling system for marine engines must be adaptable for use with either salt water or fresh water as the primary coolant. When using salt water, it is important to avoid conditions which will cause the salt to drop out with its attendant disadvantages. Therefore marine cooling systems are necessarily quite different than the cooling systems which are used in connection with modern, highly efficient engines developed for land or air vehicles.

The present invention provides an improved cooling system for modern marine internal combustion engines.

One of the objects of the invention is to provide a cooling system which retains the conventional sea water pump but provides auxiliary apparatus for improving the cooling of the cylinder block and other highly heated portions of the marine engine.

Another object is to provide for the circulation of coolant at lower temperatures through the oil coolers and at higher temperatures in the cylinder block.

A further object is to obtain a cooling system which can be readily converted from fresh water operation to salt water operation, and vice versa.

Another object is to provide a cooling system in which the engine can be operated at higher temperatures when sea water conditions are appropriate and can be operated at lower temperatures in salt water areas where lower temperatures are required.

Another object is to provide a cooling system using a conventional sea water pump and at the same time providing for greatly increased rate of circulation through the engine block to avoid overheating of critical areas and provide uniform cooling throughout the entire engine.

These and other objects are obtained by a cooling system as hereinafter more fully described and illustrated in the accompanying drawings wherein:

FIGURE 1 is a diagrammatic view of the cooling system.

FIGURE 2 illustrates a pressure relief valve.

FIGURE 3 shows a thermostatic by-pass valve.

In FIGURE 1, the cooling system is shown diagrammatically. 10 represents the cylinder block, cylinder head and intake manifold of the engine. No attempt has been made to illustrate the actual construction of these parts or the cooling passageways therethrough. 11 is an exhaust manifold arranged on the port side of the boat and 12 is a corresponding exhaust manifold on the starboard side. The port manifold leads through an adapter 13 to the overboard exhaust pipe 14. Similarly the starboard exhaust manifold 12 leads through an adapter 15 to the overboard exhaust pipe 16. 17 diagrammatically represents a cooler for the engine oil and 18 represents a cooler for the oil used in the hydraulic reverse gear.

In the cooling system of the present invention sea water is supplied by means of a sea water pump 19, having two conduits 20 leading from a sea cock and strainer device 21 mounted on the hull 22 of the boat. From the sea water pump a supply conduit 23 leads to the reverse gear oil cooler 18 and a similar supply conduit 24 leads to the engine oil cooler 17. From each of the coolers above mentioned, sea water passes through the casing 25 of a pressure relief valve shown in more detail in FIGURE 2. The inlet 26 of the valve casing is in axial alignment with the outlet 27 leading to the overboard discharge. A laterally extending outlet 28 is provided for the sea water to be supplied to the recirculating water pump 29. 31 is a movable valve held by a spring 32 against the seat 33 to close the direct passageway to the overboard exhaust The spring has a predetermined tension, for example, two pounds per square inch which permits the valve to open whenever the back pressure from the pump exceeds the predetermined tension.

The recirculating water pump 29 has two outlets leading to the opposite sides of the engine. Each outlet is connected by a conduit 34 to the interior cooling passage 35 of one of the two exhaust manifolds. The cooling passage leads to the adjacent adapter from which the coolant flows through conduit 36 into the cooling passage 37 in the cylinder block 10 of the engine. The cooling passages 35 and 37 are not illustrated in detail. However, it should be understood that passages 37 extend through the cylinder block, cylinder head and intake manifold in accordance with the standard practice. The cooling passages 37 serve to maintain the working parts of the engine at the desired temperature for efficient operation of the engine. The two passages 37 are connected by a conduit 38 to the casing of a thermostatically controlled by-pass valve 39. The casing has one outlet 40 leading to the recirculating pump 29 and another outlet 41 leading overboard. The outlet 40 is connected by conduit 42 to a fitting 43 leading to the inlet 44 of the pump. The fitting 43 is also connected by conduit 45 to the relief valves 25 previously decribed. The other outlet 41 from the by-pass valve has a T fitting 46 from which conduits 47 lead to the adapters 13 and 15 of the exhaust manifolds and then overboard.

The by-pass valve shown in more detail in FIGURE 3 is controlled by a thermostat 48. The valve 49 is adapted to move between the two seats 50 and 51. When the valve closes on seat 50, the passage to the pump is shut off. When the valve closes on seat 51, the passage overboard is shut off. The valve may take intermediate positions depending upon the response of the thermostat to the water temperature from the engine.

With the construction as described, sea water is brought into the boat by means of the sea water pump 19 and is conducted by the conduits 23 and 24 through the oil coolers 17 and 18 respectively. From each cooler, sea water is circulated through the pressure relief valve 25. Until such time as the engine is completely filled with water and has built up a predetermined back pressure, all water from the sea water pump is forced into the engine through the recirculating water pump 29. After the sea water pump has built up a pressure in the engine to the predetermined pressure, then the relief valves are forced open permitting escape of the sea water overboard. The function of the sea water pump in the system is to cool the engine oil and the reverse gear oil to a satisfactory operating temperature, to maintain a constant supply of water to the engine circulating system, and to assist in cooling and muffling the exhaust pipe.

The recirculating water pump has a capacity to circulate water through the engine at high pressure and high rate. For example, a pump may be utilized which circulates approximately seventy (70) gallons per minute through the engine at sixteen pounds pressure. From the circulating pump, sea water makes one pass through the exhaust manifold and its adapter on the rear end thereof, then through the rear cover into the cylinder block. The water continues through the cylinder block, cylinder head and finally out through the front end of the intake manifold. From this point the water enters the casing of the thermostatic by-pass valve 39. The function of the thermostat in the casing is to maintain a constant water temperature from the intake manifold water outlet. If the water in passing through the engine has not reached a high enough temperature, the thermostat allows the water to pass through into the circulating pump inlet. If, however, the water temperature has reached a maximum high according to the setting of the thermostat, the thermostatic valve closes off a portion of the water to the circulating pump and at the same time allows water to pass from the casing into the T fitting 46 and overboard.

With the cooling system as above described, it will be noted that the full capacity by volume of the sea water pump 19 is at all times passing through the exhaust lines 14 and 16 either through outlets 27 or through conduits 47. Thus adequate cooling of the exhaust lines is always maintained.

When the engine is first started, the pressure relief valves 25 are closed causing all sea water to pass through conduits 28 into recirculating pump 29. When the engine water jackets are completely filled with water, a back pressure is soon built up which will open the pressure relief valves and permit excess water from the sea pump 19 to be discharged overboard through conduits 27. The thermostat 39 permits the water from the engine water jackets to return through conduit 42 to recirculating water pump 29. When the water is sufficiently heated, the thermostat 39 opens the by-pass 41 and ejects water through conduits 47 overboard. Consequently back pressure is decreased and this in turn closes relief valve 31 and directs water from the sea water pump 19 through conduits 28 to replenish the water that has been ejected by the thermostat 39 through by-pass 47. The primary function of the relief valve is to provide assurance that the correct volume of coolant water is maintained in the engine water jackets at all times.

What I claim as my invention is:

1. In a marine engine having cooling passages surrounding the highly heated portions and having an oil cooler, a sea water supply pump, a supply line from said pump connected to said oil cooler, an adapter on the outlet side of said cooler having an overboard discharge and an engine supply line, a recirculating pump connected to receive sea water from said supply line and propel the same through said engine cooling passages, a second adapter on the outlet side of said passages having an overboard discharge line, a recirculating conduit between said second adapter and the inlet of said recirculating pump, a thermostatic valve in said second adapter compelling the recirculation of sea water when at a temperature below a predetermined setting and also permitting overboard discharge when above said temperature setting, and a pressure relief valve in said first adapter for regulating the inlet supply to said recirculating pump in proportion to the overboard discharge from said second adapter.

2. The combination as in claim 1 wherein there are two oil coolers, each connected to a separate adaptor having an overboard discharge and an engine supply, each of said separate adaptors having a relief valve, and the inlet of said recirculating pump is connected to both of said adaptors.

3. The combination as in claim 1 in which the sea water from said recirculating pump is divided and separately circulated through different portions of the engine and then recombined into said second adapter.

4. The combination as in claim 1 in which the full capacity of said sea water supply pump, at all times passes to overboard discharge through the first and second adapters aforesaid.

5. In a marine engine having cooling passages surrounding the highly heated portions, a sea water supply pump, a supply line from said sea water pump, an adaptor in said supply line having an overboard discharge and an engine supply line, a recirculating pump connected to receive sea water from said supply line and propel the same through said engine cooling passages, a second adapter on the outlet side of said passages having an overboard discharge line, a recirculating conduit between said second adapter and the inlet of said recirculating pump, a thermostatic valve in said second adapter compelling the recirculation of sea water when at a temperature below a predetermined setting and also permitting overboard discharge when above said temperature setting, and a pressure relief valve in said first adapter for regulating the inlet supply to said recirculating pump in proportion to the overboard discharge from said second adapter.

6. The combination as in claim 5 in which the full capacity of said sea water supply pump at all times passes to overboard discharge through the first and second adaptors aforesaid, and the sea water from said recirculating pump is divided and separately circulated through different portions of the engine and then recombined into said second adaptor.

7. The combination as in claim 5 in which the marine engine includes a cylinder block, cylinder head, intake manifold, exhaust manifold and exhaust line leading overboard from said exhaust manifold, and the cooling passages from said recirculating pump extend successively through said exhaust manifold, cylinder block, cylinder head and intake manifold into said second adaptor, said recirculating pump having a capacity to circulate water through said successively extending cooling passages at high pressure and high rate, and said sea water pump having a capacity to maintain a constant supply of water to said recirculating pump and at all times to discharge overboard through the first and second adaptors aforesaid.

8. The combination as in claim 5 in which the marine engine includes oppositely disposed pairs of cylinder blocks, cylinder heads, intake manifolds, exhaust manifolds and exhaust lines leading overboard from the respective exhaust manifolds, and the cooling passages from said recirculating pump extend on each opposite side successively through the respective exhaust manifold, cylinder block, cylinder head and intake manifold, the cooling passages from the opposite sides of the engine being combined into said second adaptor, said overboard discharge line from said second adaptor being branched and connected to each of the oppositely disposed exhaust lines leading overboard, and said overboard discharge from said first adaptor being connected to each of the oppositely disposed exhaust lines leading overboard, whereby the full capacity of said sea water supply pump at all times passes through the first and second adaptors aforesaid into said exhaust lines leading overboard.

9. *In a marine engine having cooling passages surrounding the highly heated portions, a sea water supply pump, a recirculating pump, means defining a recirculatory flow path through which the output water from said recirculating pump is normally circulated through said engine cooling passages and returned to the inlet of said recirculating pump, thermostatic means responsive to the tem-*

*perature of water in said recirculatory flow path for diverting the water to overboard discharge when the temperature thereof exceeds a predetermined temperature, a supply line from said sea water pump to the inlet of said recirculating pump, an overboard discharge line from said sea water pump, and means to compel delivery of water from said sea water pump to the inlet of said recirculating pump to maintain full volume of coolant water in said engine passages while permitting diversion of excess water from said sea water pump to overboard discharge, said means including pressure relief.*

*10. In a marine engine having cooling passages surrounding the highly heated portions, a sea water supply pump, a recirculating pump, means defining a recirculatory flow path through which the output water from said recirculating pump is normally circulated through said engine cooling passages and returned to the inlet of said recirculating pump, thermostatic means responsive to the temperature of water in said recirculatory flow path for diverting the water to overboard discharge when the temperature thereof exceeds a predetermined temperature, a supply line from said sea water pump to the inlet of said re irculating pump, an overboard discharge line from said sea water pump, and pressure producing means cooperating with the pressure from said sea water pump to compel delivery of water from said sea water pump to the inlet of said recirculating pump to maintain full volume of coolant water in said engine passages while permitting diversion of excess water from said sea water pump to overboard discharge.*

*11. In a marine engine having cooling passages surrounding the highly heated portions, a sea water supply pump, a recirculating pump, means defining a recirculatory flow path through which the output water from said recirculating pump is normally circulated through said engine cooling passages and returned to the inlet of said recirculating pump, thermostatic means responsive to the temperature of water in said recirculatory flow path for diverting the water to overboard discharge when the temperature thereof exceeds a predetermined temperature, an engine supply conduit continuously below the top of the engine from said sea water pump to the inlet of said recirculating pump, a branch conduit from said engine supply conduit leading to overboard discharge, and means for applying pressure to the water in said engine supply conduit to compel delivery of water from said sea water pump to the inlet of said recirculating pump to maintain full volume of coolant water in said engine passages while permitting diversion of excess water through said branch conduit to overboard discharge.*

*12. The combination as in claim 9 in which an oil cooler is provided between said sea water pump and the overboard discharge therefrom.*

*13. In an apparatus for supplying raw water to the cooling system of an internal combustion engine, a dual pump arrangement comprising a centrifugal pump, a positive displacement pump, means for driving said pumps, means defining a recirculatory flow path through which the output water of said centrifugal pump is normally circulated to cool said engine, thermostatic means responsive to the temperature of water in said flow path for diverting the water to exhaust when the temperature thereof exceeds a predetermined temperature, a pressure relief valve establishing a predetermined minimum pressure at which make-up water is supplied by said positive displacement pump, and means venting the make-up at said minimum pressure into said recirculatory flow path to replenish water exhausted therefrom.*

*14. A marine engine cooling system comprising a raw water intake pump, means defining a recirculatory flow path including a first chamber through which water is circulated to cool said engine, a recirculating pump connected in said flow path with its intake in communication with said first chamber to pump water through said recirculatory flow path, means for continuously driving both of said pumps, means defining an outlet chamber having a first inlet port in communication with the outlet of said intake pump and a second inlet port in communication with said first chamber, pressure responsive valve means at first inlet port for placing the outlet of said intake pump in communication with said outlet chamber when the pressure at the outlet of said intake pump exceeds a predetermined pressure, thermostatically controlled valve means at said second port for connecting said first chamber to said outlet chamber when the temperature of water in said recirculatory flow path exceeds a predetermined temperature, and means defining a passage placing the outlet of said intake pump in constant free and open communication with said first chamber.*

*15. In an apparatus for supplying sea water to the cooling system of an internal combustion engine, a recirculating pump, a sea water pump, means for driving said pumps, means defining a recirculatory flow path through which the output water of said recirculating pump is normally circulated to cool said engine, thermostatic means responsive to the temperature of water in said flow path for diverting the water to overboard discharge when the temperature thereof exceeds a predetermined temperature, pressure relief means establishing a predetermined minimum pressure at which make-up water is supplied by said sea water pump, and means venting the make-up at said minimum pressure into said recirculatory flow path to replenish water discharged overboard therefrom.*

*16. A marine engine cooling system comprising a sea water pump, means defining a recirculatory flow path including a first chamber through which water is circulated to cool said engine, a recirculating pump connected in said flow path with its intake in communication with said first chamber to pump water through said recirculatory flow path, means for continuously driving both of said pumps, means defining an outlet chamber having a first inlet port in communication with the outlet of said sea water pump and a second inlet port in communication with said first chamber, pressure responsive means permitting communication between the outlet of said sea water pump and said outlet chamber when the pressure exceeds a predetermined pressure, thermostatically controlled valve means at said second port for connecting said first chamber to said outlet chamber when the temperature of water in said recirculatory flow path exceeds a predetermined temperature, and means defining a passage placing the outlet of said sea water pump in constant free and open communication with said first chamber.*

*17. In an apparatus for supplying liquid coolant to the cooling system of an internal combustion engine, a dual pump arrangement comprising a recirculating pump, a sea water pump, means for driving said pumps, means defining a recirculatory flow path through which the output of said recirculating pump is normally circulated to cool said engine, said flow path successively including the highly heated portions of the engine and exhaust manifolds, thermostatic means located in said flow path between said manifolds and the intake of said recirculating pump and responsive to the temperature of said coolant flowing from said exhaust manifolds for diverting the coolant from said recirculatory flow path when the temperature of said coolant exceeds a predetermined temperature, and means directly responsive to the diversion of coolant by said thermostatic means for utilizing the output of said sea water pump to cool said coolant.*

*18. In an apparatus for supplying liquid coolant to the cooling system of an internal combustion engine, a dual pump arrangement comprising a recirculating pump, a sea water pump, means for driving said pumps, means defining a recirculatory flow path through which the output of said recirculating pump is normally circulated to cool said engine, said flow path successively including the highly heated portions of the engine and exhaust manifolds, thermostatic means located in said flow path*

*between said manifolds and the intake of said recirculating pump and responsive to the temperature of said coolant flowing from said exhaust manifolds for diverting the coolant from said recirculatory flow path when the temperature of said coolant exceeds a predetermined temperature, and means directly responsive to the diversion of coolant by said thermostatic means for utilizing the output of said sea water pump to cool said coolant; wherein said thermostatic means vents the coolant to exhaust and the last mentioned means includes a passage interconnecting the output of said sea water pump and the intake of said recirculating pump to supply additional make-up coolant from said sea water pump.*

References Cited

The following references, cited by the Examiner, are of record in the patented file of this patent or the original patent.

UNITED STATES PATENTS

| | | | |
|---|---|---|---|
| 1,361,033 | 12/1920 | Erickson | 123—41.08 |
| 2,284,381 | 4/1942 | Du Pont | 123—41.09 X |
| 2,478,489 | 8/1949 | Kelson | 123—41.08 |
| 2,757,650 | 8/1956 | Holley | 123—41.31 X |
| 3,163,157 | 12/1964 | Connell | 123—41.09 |

AL LAWRENCE SMITH, *Primary Examiner.*

UNITED STATES PATENT OFFICE

CERTIFICATE OF CORRECTION

Reissue No. 26,400

June 4, 1968

Elmer P. Jasper

It is certified that error appears in the above identified patent and that said Letters Patent are hereby corrected as shown below:

In the heading to the printed specification, line 4, "to Chris Craft Industries," should read -- to Chris Craft Industries, Inc., --.

Signed and sealed this 16th day of December 1969.

(SEAL)
Attest:

Edward M. Fletcher, Jr.
Attesting Officer

WILLIAM E. SCHUYLER, JR.
Commissioner of Patents